June 13, 1961 H. J. SMILEY 2,988,113

METHOD AND APPARATUS FOR WEAVING WIRELESS PILE FABRIC

Filed Aug. 15, 1957 5 Sheets-Sheet 1

INVENTOR:
HARRY J. SMILEY

BY Hyde W. Ballard
ATTY.

June 13, 1961 H. J. SMILEY 2,988,113

METHOD AND APPARATUS FOR WEAVING WIRELESS PILE FABRIC

Filed Aug. 15, 1957 5 Sheets-Sheet 2

INVENTOR:
HARRY J. SMILEY

BY Hyde W. Ballard
ATTY.

June 13, 1961 H. J. SMILEY 2,988,113

METHOD AND APPARATUS FOR WEAVING WIRELESS PILE FABRIC

Filed Aug. 15, 1957 5 Sheets-Sheet 3

INVENTOR
HARRY J. SMILEY

BY Hyde W. Ballard
ATTY.

June 13, 1961 H. J. SMILEY 2,988,113

METHOD AND APPARATUS FOR WEAVING WIRELESS PILE FABRIC

Filed Aug. 15, 1957 5 Sheets-Sheet 4

INVENTOR
HARRY J. SMILEY
BY Hyde W. Ballard
ATTY.

INVENTOR
HARRY J. SMILEY
BY Hyde W. Ballard
ATTY

United States Patent Office 2,988,113
Patented June 13, 1961

2,988,113
METHOD AND APPARATUS FOR WEAVING WIRELESS PILE FABRIC

Harry J. Smiley, Glasgow, Va., assignor to James Lees and Sons Company, Bridgeport, Pa., a corporation of Pennsylvania Filed Aug. 15, 1957, Ser. No. 678,351
3 Claims. (Cl. 139—25)

This invention relates to methods and apparatus for weaving without the use of pile wires a fabric having pile projections on one side thereof.

In the weaving of pile fabrics such as rugs and carpets, it has long been an object to increase the speed of loom production and still produce commercially acceptable fabrics. The velvet loom for weaving carpet is the fastest of the various types of looms since the range of pattern as dictated by a jacquard or the tube frames (in the case of Axminster) is not present. Nevertheless, it is considered to be of prime importance to increase the speed with which velvet-type rugs and carpets can be woven. One of the chief limiting factors in this regard is the wire motion by means of which the pile wires are inserted into and withdrawn from the warp sheds. Without such a limiting factor, it is possible to more nearly approach the speed of a carpet tufting machine.

I am familiar with the teaching of Hoeselbarth Patent No. 2,714,399 which pertains to the same subject matter. However, I have found that my improved method produces a more commercially saleable product because the control of the pile height is more accurate, thereby producing an even surface; and the possibility of loops being formed on the back of the fabric, as in terry pile weaving, is minimized, if not eliminated. My present invention provides means for precisely controlling the tension or load on the various warp ends which is a most critical factor in weaving without pile wires, and is a necessity under the conditions of substantially reduced pile yarn tension as has been set forth in Hoeselbarth.

A primary object of the invention, therefore, is to provide an improved method for weaving a wireless pile fabric to produce symmetrical pile loops on one side of the fabric.

A further object of the invention is to control the position of the shed-forming pile wraps to insure accurate and repetitive pile projections.

A further object of the invention is to provide an improved method for weaving a one-shot wireless pile fabric.

A still further object of the invention is to provide an improved method for weaving a two-shot wireless pile fabric.

A further object of the invention is to provide means for accurately controlling the tension on a plurality of sets of pile yarn ends.

A further object of the invention is to provide means for weaving a wireless pile fabric from a single warp beam and in which the tension on all warps is substantially equal.

Figures 1, 2, 3, 4:
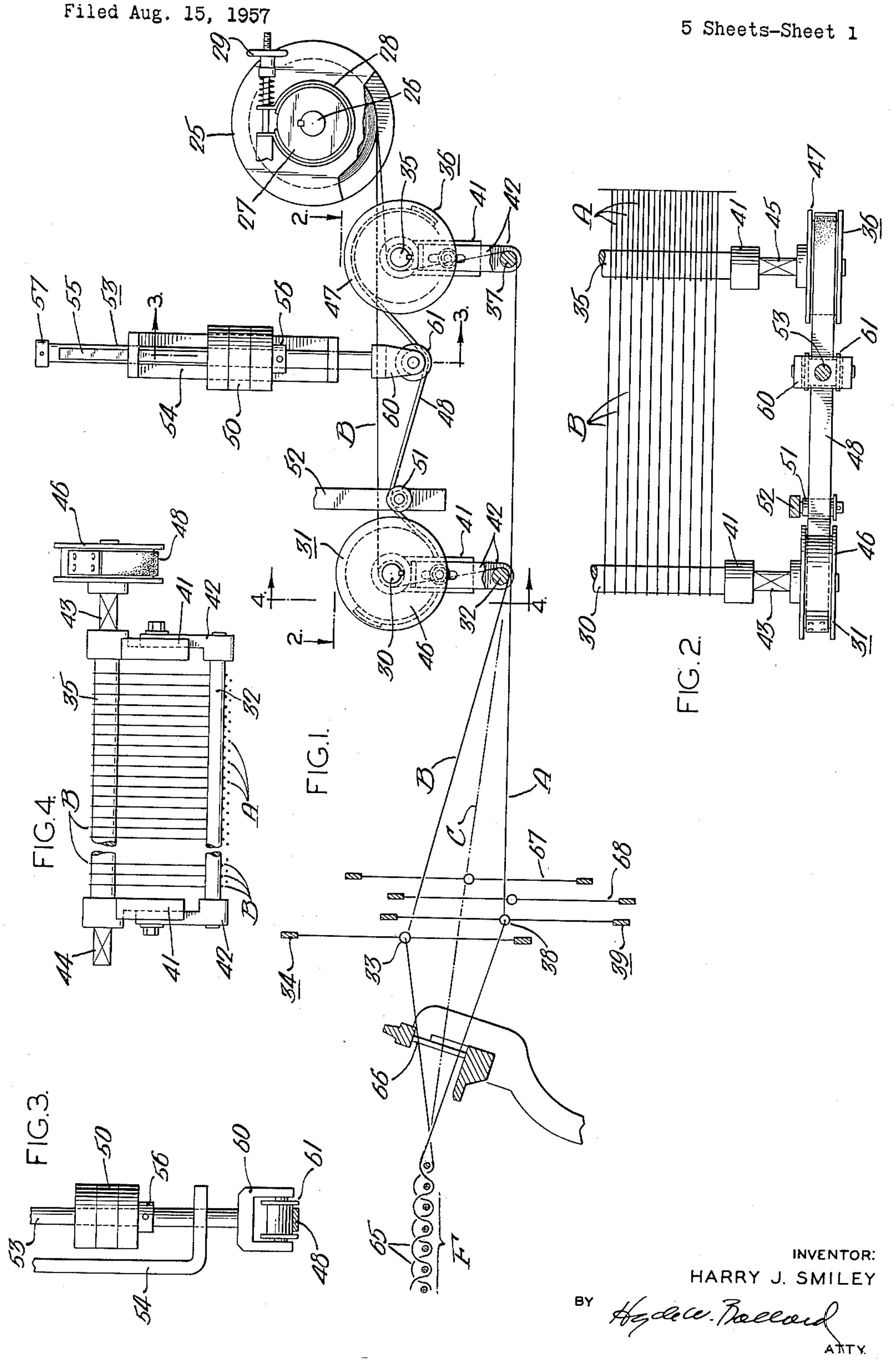

Further objects will be apparent from the specification and drawings in which:

FIG. 1 is a schematic view showing one embodiment of my improved tension control mechanism as applied to a wireless pile loom, FIG. 2 is a fragmentary top view as seen at 2—2 of FIG. 1, FIG. 3 is a fragmentary detail as seen at 3—3 of FIG. 1, FIG. 4 is a fragmentary detail as seen at 4—4 of FIG. 1, FIGS. 5–10 are diagrammatic shed diagrams showing the various steps in weaving a one-shot wireless pile fabric in accordance with the present invention.

Figure 9:
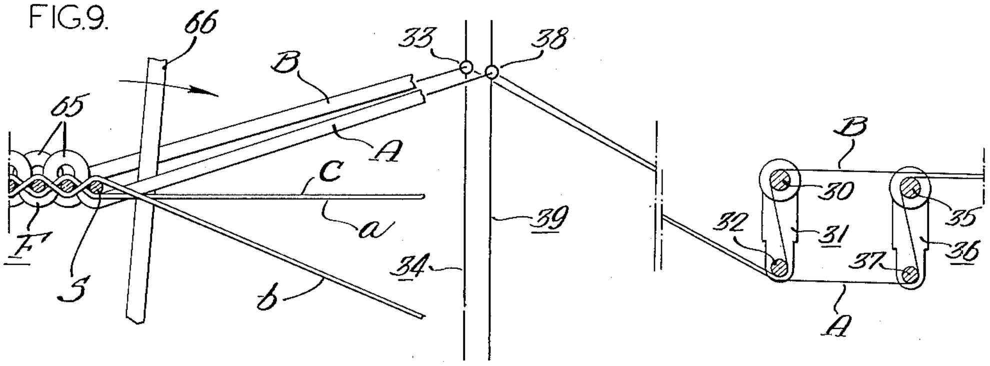
Figure 10:
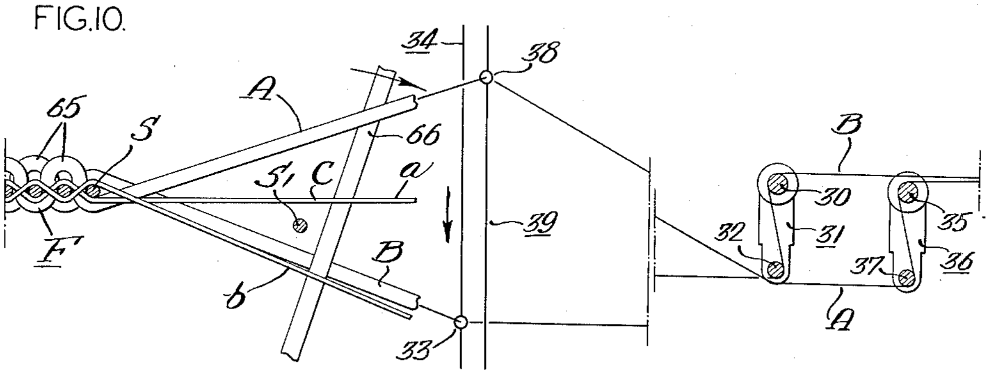
Figure 11:
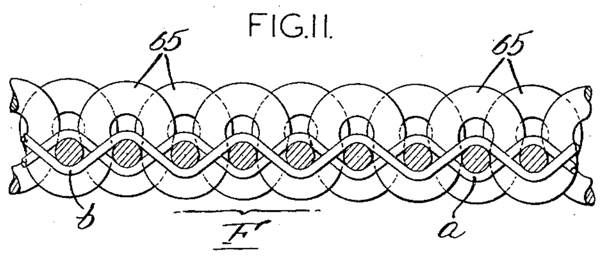
Figure 18:
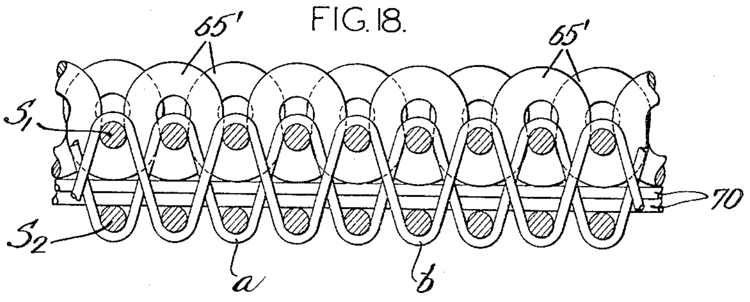
Figure 19:
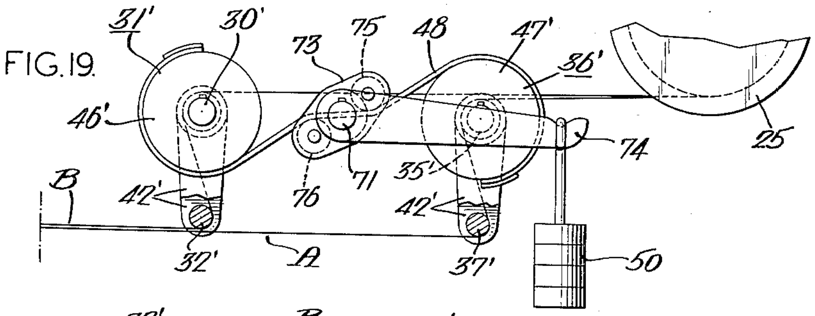
Figure 20:
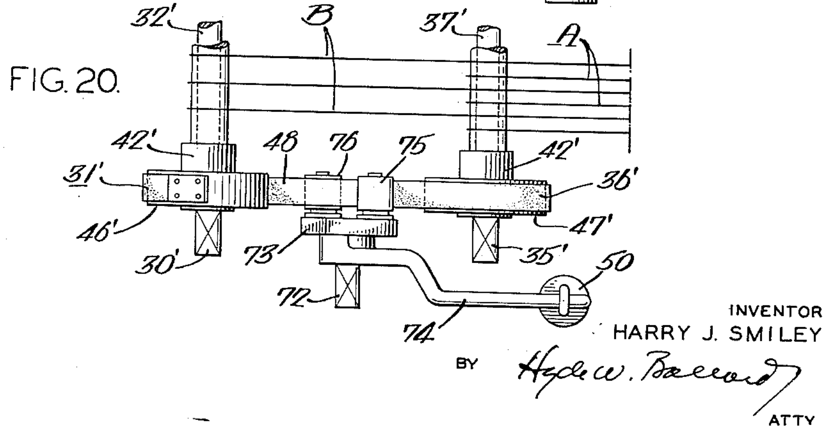

FIG. 11 is an enlarged warpwise section of the fabric woven in accordance with FIGS. 5–10, FIGS. 12–17 are schematic shed diagrams showing the steps in weaving a two-shot wireless pile fabric in accordance with the present invention, FIG. 18 is an enlarged warpwise section of a two-shot wireless pile fabric woven in accordance with FIGS. 12–17, FIG. 19 is a side view of a preferred form of a tension control device in accordance with the present invention, and FIG. 20 is a top view of the device of FIG. 19.

The invention comprises essentially the provision of a tension equalizer between two jumbos or cradles in a conventional velvet loom. A "jumbo" may be defined as a specialized form of whip roll which not only guides the warp yarns after leaving the beam, but also exerts some tension regulation. In the preferred form the pile warp ends are separated into two sets of pile from a single beam. A set is laced through each jumbo to supply the warp yarns for the top and bottoms of the successive sheds. A single weight is applied to both jumbos through an interconnecting strip or band in such a way, that the tension or load applied to the yarn carried by each jumbo is substantially equal. Furthermore, the tensioning device is so designed that it is extremely susceptible to small increments of weight applied thereto.

The improved method involves essentially the proper control of the pile yarns forming the shed so that tension is released from one set of pile yarns at approximately the same time that a shot of filling is partially beaten up by the reed, and the warp yarns are simultaneously raised to snub them around the filling shot, thereby to provide sufficient slack in the pile yarn to form successive pile projections of substantially equal height.

Referring now more particularly to the drawings, warp pile yarns A and B are supplied to a loom, not shown, from a single warp beam 25. The warp beam is journaled on a shaft 26 to which there is keyed a brake drum 27 frictionally engaged with a brake band 28 and tension regulating means 29. The warp yarns A and B are separated so that warp yarns B are laced over shaft 30 of jumbo 31, thence around the secondary shaft 32 of the jumbo before being carried to the eyes 33 of harness 34. In a similar manner the warp yarns A are carried around shaft 35 of jumbo 36, thence around bar 37 and to eyes 38 of harness 39.

Jumbos or cradles are themselves old in the art and used to supply tension to warp yarns in much the same manner. It is believed, however, that the use of two separate jumbos, laced in parallel, so to speak, to provide more accurate tension control and also to permit variation in the feed of one set of yarns compared to the other, is broadly new. This relative feed in the two sets of yarns A and B will be explained more fully in connection with FIGS. 5–10 and 12–17. As shown in FIG. 4, each jumbo has a pair of adjustable arms 41 and 42 keyed to shaft 30 which is journaled at 43 and 44. Bar 32 is carried at the lower end of the adjustable arms 41 and 42 so that the yarns B pass in front of shaft 30 and in back of bar 32, as seen in FIG. 4. It will be understood that the construction of jumbo 36 is identical, and like reference numerals are used to denote the adjustable arms thereon.

Referring to FIG. 2, the jumbos 31 and 36, constructed in accordance with the present invention, have been modified by extending their respective shafts 30 and 35 beyond journals 43 and 45 and keying thereto a pulley or drum 46 and 47. A flexible strip, band, or cable 48 is anchored to each of the drums or pulleys 46 and 47 and carried in a counterclockwise direction around the periphery of both drums or pulleys 46 and 47 so that it feeds from the bottom of pulley 46 and from the top of pulley 47. A weight 50 is then positioned so that it is supported by the free length of member 48 and the gravitational effect of weight 50 tends to turn pulleys 46 and 47 in a counter-clockwise direction, thus applying tension to warp yarns A and B. Furthermore, the tension applied to the yarns will be exactly equal, provided, of course, that the length of arms 41 and 42 is the same for each jumbo. In order to obtain a substantially vertical component for the gravitational effect of weight 50, I employ a secondary guide pulley 51 mounted on stationary support 52 over which the member 48 passes after leaving the periphery of drum 46. The weights 50 are replaceable on a vertical shaft 53 which is slidably carried in a U-shaped bracket 54 (FIG. 3) and also provided with a flat 55 to prevent rotation of shaft 53 in the bracket. A collar 56 is adjustably secured to the shaft to support the weights 50, and a secondary limit collar 57 may be secured to the shaft if desired. The bottom of shaft 53 carries a yoke 60 which in turn journals a pulley or flanged roller 61 bearing on the upper surface of member 48.

It will thus be understood that very accurate and precise control of tension may be applied to the warp yarns A and B by the application of weights 50 on shaft 53, and also the adjustment of brake band 28 through adjustable means 29. It has been found that satisfactory results can be achieved if brake band 29 is set to produce sufficient friction merely to prevent overrunning of the yarn ends. Any additional tension needed may be applied by means of weights 50. Nevertheless, an increase in tension by means of tightening of band 28 may be offset by removing suitable weights 50 so that the basic tension is applied at the beam and the weights are used merely for permitting relative movement of shafts 30 and 35 in accordance with the formation of the sheds.

Figure 5:
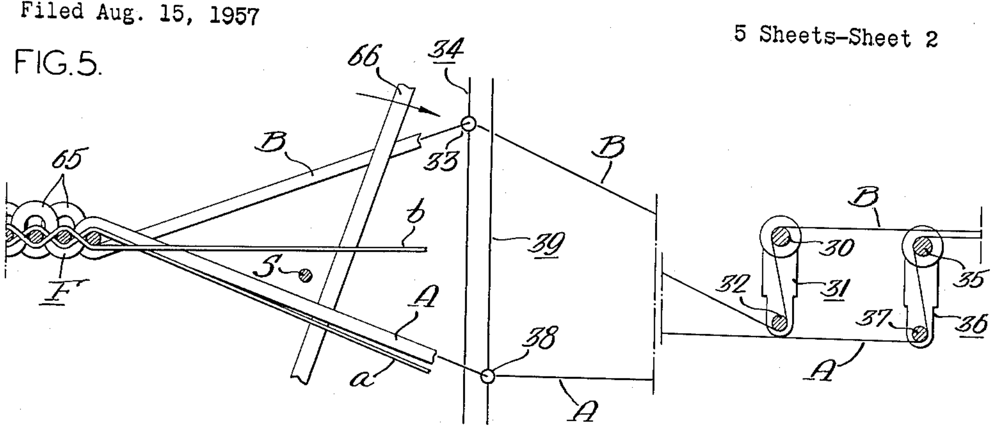

Referring now to FIGS. 5–10, a single-shot fabric F having raised pile loops or projections 65 is woven without the use of pile wires in accordance with the invention by controlling the warp yarns in such a manner that the loops are raised to a substantially uniform height solely by the action of the reed 66. In FIG. 5, the treatment of a pair of pile yarns A and B is followed, but it will be understood that each of the yarns A and B is a part of a series of warp yarns which are manipulated to form the conventional sheds through which a filling shot S is inserted by means of a shuttle or a needle.

In FIG. 5, yarn B is raised to top position by means of harness 34 and the yarn A is lowered to bottom position by harness 39. The chain warps *a* and *b* are supplied from a yarn source, not shown, and are controlled through harnesses 67 and 68, shown diagrammatically in FIG. 1 but omitted in FIGS. 5–10 for the purpose of clarity. Chain *a* is carried to the lower position in FIG. 5, whereas chain *b* is held in a mid-position, so that the shot S is inserted over pile warp A, chain warp *a*, and under pile warp B and chain warp *b*. In the draw shown in FIG. 5, a double chain is used on either side of each pile warp with the chain adjacent the pile yarn working with the pile yarn instead of in opposition to it. It has been found in practice that the draw of the chain warps is not critical, but by placing at least one chain warp on each side of a pile yarn, whether working in opposition or with the pile yarn, the yarn is prevented from forming a loop on the bottom or underneath the shots. With the reed 66 substantially in the back position, as shown in FIG. 5, the jumbos 31 and 36 are not displaced relative to each other and may be assumed to be in a parallel position as shown. This position may be with the jumbo arms 42, 42 substantially vertical.

Figure 6:
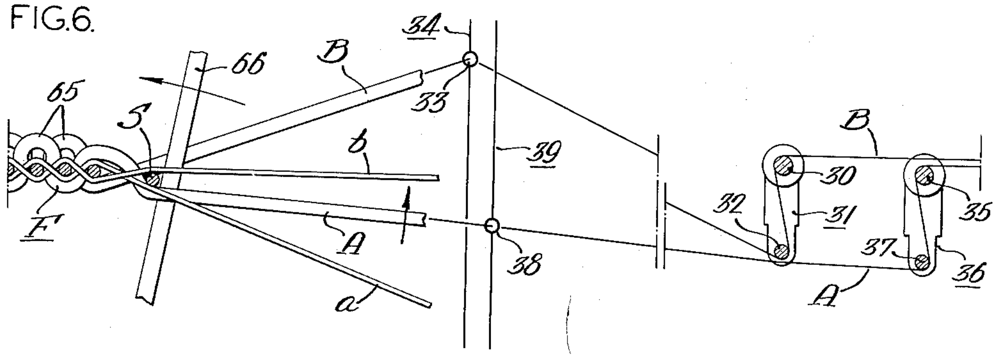
Figure 7:
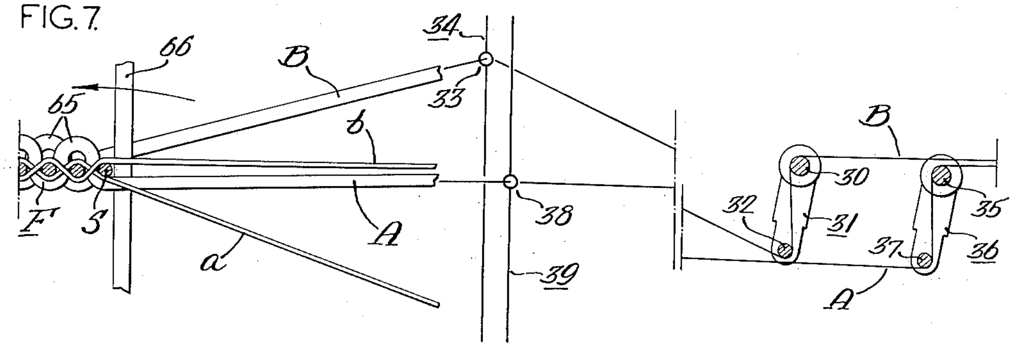

As the reed 66 starts to beat up, as shown in FIG. 6, harness 39 immediately rises, thus positioning yarn A nearer to the center line C of the shed with two important results. First, there is provided a definite slack in the yarn since it has been moved from an extended position to the straight line or mid-position. Second, the yarn A is snubbed around shot S with sufficient friction to overcome any tendency of jumbo 36 to retract the yarn away from the fell of the goods. In other words, the slack provided in yarn A is gathered up and accumulated by the shot and the reed in front of the shot and above the chain warp *a* to supply the necessary yarn to form the next loop 65. At full beat-up, as shown in FIG. 7, the loop 65 has been formed above the goods with the pile warp A in the maximum slack position. Full forward movement of the reed 66 pulls both warp yarns A and B through the jumbos which will pivot them to a forward position as indicated in FIG. 7. This, in turn, means that the weight 50 moves up since both of the arms 42, 42 act in unison in the same direction.

Figure 8:
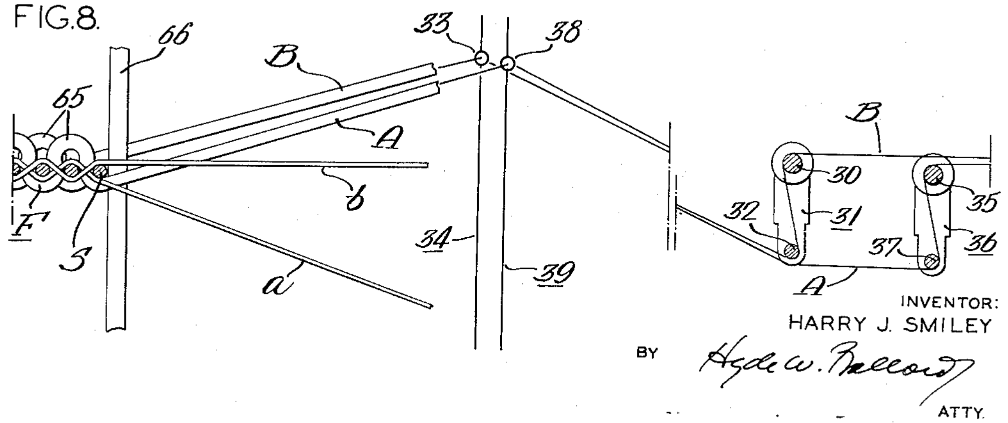

With the reed still in the full beat-up position, shown in FIG. 8, pile yarn A is carried to the top position to complete a snubbing action around shot S and to insure that the last-formed loop 65 is not lowered or robbed during final beat-up. In the meantime, sufficient yarn has been drawn from beam 25 to permit the arms 42, 42 to resume their initial position.

As the reed 66 reverses direction, shown in FIG. 9, the chain warps *a* and *b* reverse, so that warp *a* is now in the mid-position and warp *b* in the lower position. Pile yarn A remains in the raised position, whereas yarn B drops to the lower position as seen in FIG. 10. However, when yarn B passes through the center position C, slack will occur as previously explained in connection with FIG. 6. In this part of the cycle, however, such slack is not utilized to form a loop 65, so that one of the jumbos pivots counterclockwise with respect to the other. In the case of yarn B, it will be jumbo 31. This action lowers weight 50 slightly, but at the same time maintaining tension on all the pile yarns and permitting individual relative movement as may be required. FIG. 10 ends the repeat in the cycle and shows the elements in the same position as FIG. 5 except that all the piles are reversed and the next shot S1 is inserted. The weaving thus continues by repeating the above cycle. The utilization of controlled slack in the pile yarn which is forming a loop and maintaining tension in the pile yarn which is not forming a loop is believed to be an important feature of the invention, as well as the ability to snug the loop-forming pile yarn to insure that a uniform length of yarn is supplied at each beat-up of the reed to form equal loops regardless of which pile yarn is being woven into the fabric. FIG. 11 is an enlarged view showing the one-shot fabric described above and illustrating the extremely even and uniform height of the loops.

Figure 12:
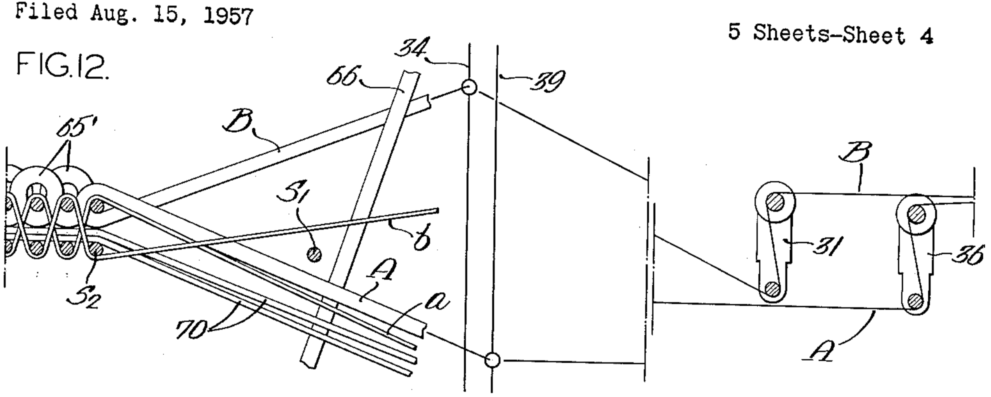
Figure 13:
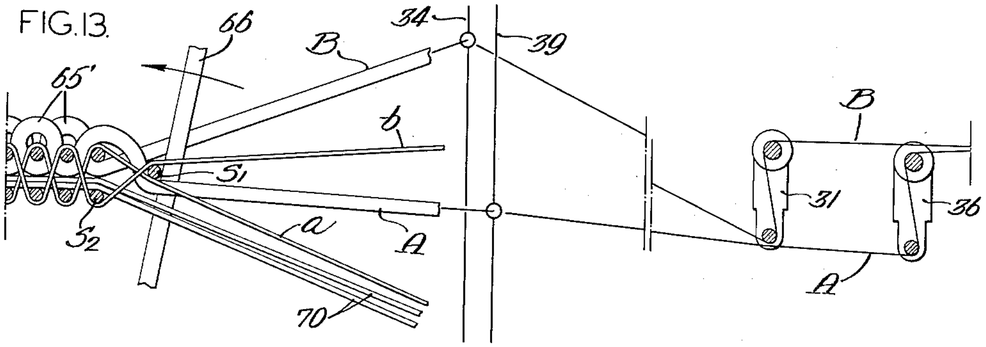
Figure 14:
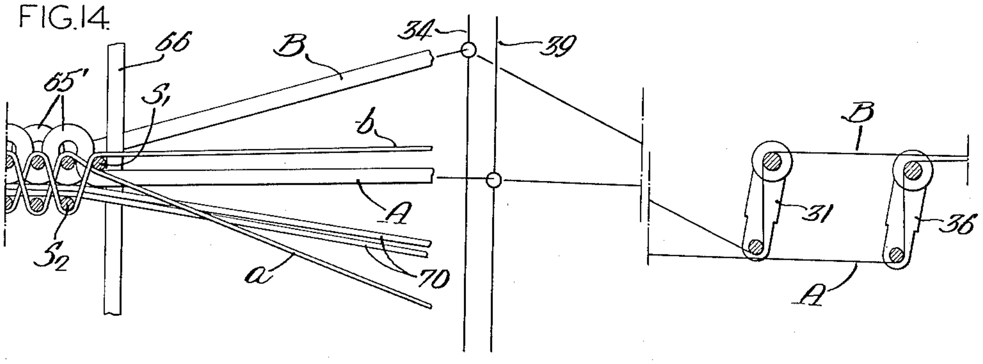
Figure 15:
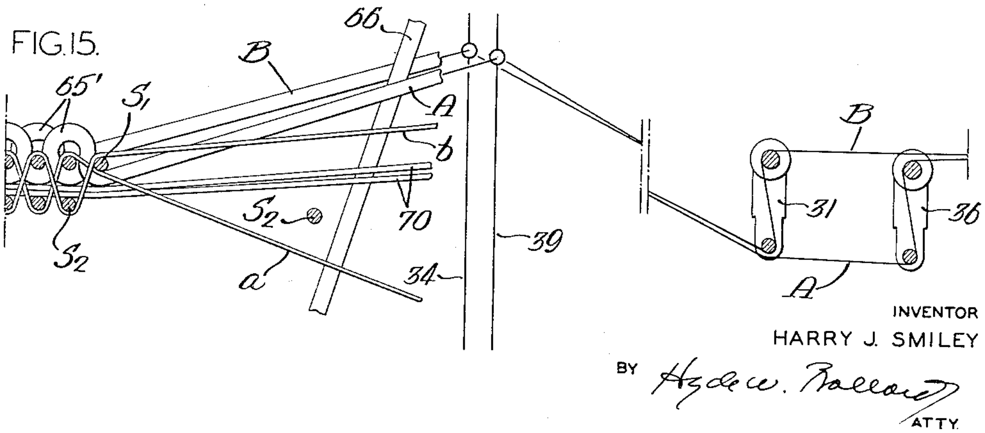
Figure 16:
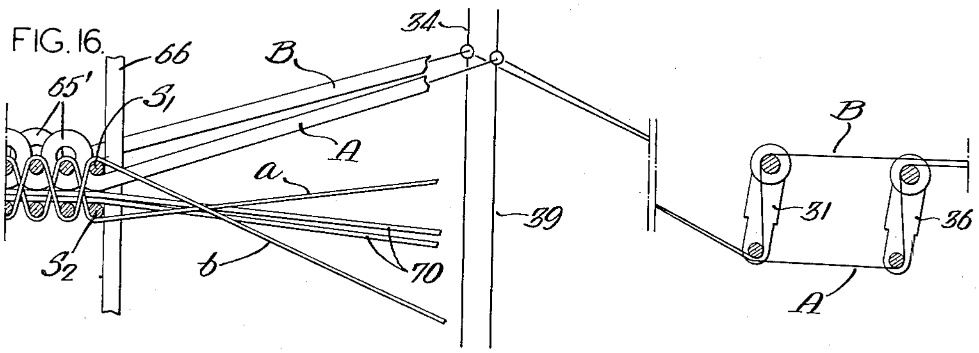
Figure 17:
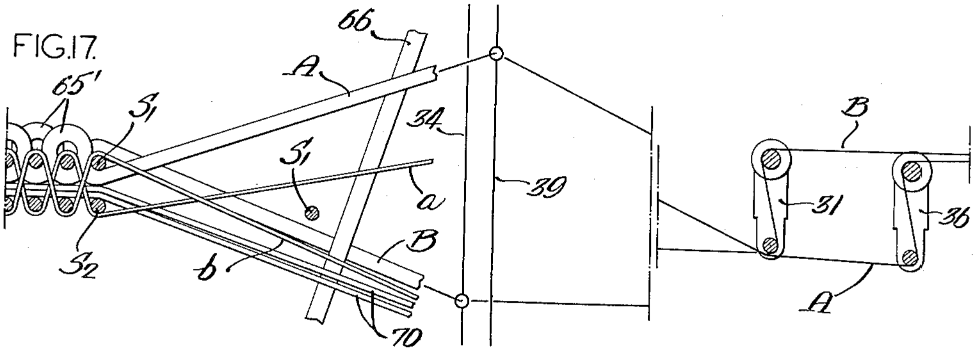

The same procedure is employed to weave a two-shot fabric, as shown in FIGS. 12–17. In this case a stuffer 70 is added and a second shot S2 is inserted to provide a double plane ground fabric. In FIG. 12, chain warp *b* is raised, as is pile warp B. All other warps, including stuffer 70, are lowered. Shot S1, which will be a top shot, is inserted over pile warp A and under chain warp *b*. As the reed beats up shot S1 towards the fell, pile warp A is raised to snub the warp A around the shot S1 and simultaneously to provide the slack to form the loop 65′. Continued forward movement of the reed utilizes all the slack to form the loop 65′ and additionally pulls the fabric forward to draw more yarn from the beam. This is illustrated in FIG. 14, and in FIG. 15 the reed is back while all warps are raised except chain *a* so that the bottom shot S2 can be inserted under these warps and over chain warp *a*. On the next beat-up, shown in FIG. 16, no loop is formed since this beat-up is only to position the bottom shot S2 in the fell. Pile warps A and B remain unchanged but chain warps *a* and *b* reverse as the reed retracts, whereupon pile warp B is lowered to put in the next top shot S1, so that FIG. 17 corresponds to FIG. 12 but with the pile and chain warps reversed. The weaving of the two-shot fabric then proceeds in accordance with the above cycle.

A somewhat simplified tension arrangement is shown in FIGS. 19 and 20 in which the means for applying the weight 50 to band 48 comprises a shaft 71 journaled at 72 and having a yoke 73 and a lever arm 74 keyed thereto. The weights 50 are suspended from the end of lever arm 74 and the yoke 73 is provided with a pair of spaced rollers or band contact elements 75 and 76 which engage opposite sides of the band. Increase of weight 50 tends to displace the band 48, thereby shortening it to turn drums 46' and 47' in a counterclockwise direction. Removal of weights 50 permits the band 48 to straighten and thus turn the drums and arms 42 in a clockwise direction. It will be understood that the band 48 may be flat, round, or any other desired shape and that the means shown for applying force or tension to the band are illustrative only of any device which can be utilized to supply equal turning force to each drum.

In either the one- or two-shot construction special yarns may be used, such as novelty yarns, to provide any desired pattern effect. Where precise uniformity of pile projection may not be required a single jumbo can be employed with satisfactory but somewhat different effects. The fabric may be backsized in accordance with usual practice or a foam rubber back may be used to provide adequate pile bind, particularly in the one-shot construction.

The apparatus has been found to be very effective in equalizing the tension between the various warp yarns used to form the shed. This is important when drawing from only one beam but, of course, may be used in a similar manner regardless of whether the yarn is drawn from one or more beams, as would be the case when using yarn of different character or color. By permitting the individual warp yarns to slacken in order to supply the yarn for loop forming and yet at the same time maintaining proper tension on each yarn, I have overcome a serious difficulty found to be present in previous devices for weaving wireless fabric. In addition, the proper control of the yarns in the shed to insure that the slack occurs in only one yarn at the time it is being beaten up into the fell and that it is positioned to be snubbed by the shot being beaten up is another important feature of the invention. In so controlling the pile yarns, it has been found that the relative number and position of the chain warps is not critical.

Having thus described my invention, I claim:

1. In a pile fabric loom the improvement which comprises a supply of pile warp yarn, at least two jumbos through each of which a portion of said yarn is laced, a shaft for each of the jumbos, a journal for each of said shafts, a pulley keyed to each of said shafts, a band interconnecting said pulleys in opposite directions, and a weight suspended by said band, said weight applying torsion to each of the jumbos in the same direction.

2. The method of weaving a wireless pile fabric having warp pile yarns and binder warps interwoven with filling wefts which comprises the steps of raising a first set of warp pile yarns to a top shed position, lowering a second set of warp pile yarns to a bottom shed position, said second set of pile warp yarns passing over the last inserted weft, applying substantially equal elevated tension to each of said sets of pile yarns at the fell of the fabric, inserting a filling weft into the shed, beating up said filling weft towards the fell, snubbing the yarns of the second set around said filling weft during beat up, maintaining said elevated tension on the first pile yarn set at the fell to prevent the formation of terry loops on the back of the fabric, maintaining said elevated tension on the second pile yarn set at the filling weft, interconnecting said tensions, raising the second set of pile yarns, reducing the tension on the second set of pile yarns between the weft and the fell, completing the beat up of the weft and the second pile yarn set to form terry loops on the top of the fabric and to draw fresh pile yarns of both sets from a yarn supply under substantially equal inter-compensated tension, lowering the first pile yarn set to the bottom shed position, completing the raising of the second pile yarn set to top shed position, and repeating the above weaving cycle.

3. In a pile fabric loom the improvement which comprises a supply of pile warp yarn, at least two jumbos through each of which a portion of said yarn is laced, a rotation responsive connection between said jumbos, a yoke straddling the connection, and a lever for turning the yoke to shorten and lengthen the connection in accordance with a turning force applied to the lever.

References Cited in the file of this patent

UNITED STATES PATENTS

| | | |
|---|---|---|
| 443,612 | Emery | Dec. 30, 1890 |
| 1,539,178 | Giardino | May 26, 1925 |
| 1,665,274 | Neisler | Apr. 10, 1928 |
| 1,766,805 | Wakefield | June 24, 1930 |
| 2,553,303 | Crawford | May 15, 1951 |
| 2,701,586 | Crawford | Jan. 13, 1954 |
| 2,714,399 | Hoeselbarth | Aug. 2, 1955 |
| 2,814,314 | Harding | Nov. 26, 1957 |
| 2,891,582 | Hoeselbarth | June 23, 1959 |

FOREIGN PATENTS

| | | |
|---|---|---|
| 280 | Great Britain | of 1905 |
| 25,132 | Austria | July 25, 1906 |

OTHER REFERENCES

"Development, Production and Uses of Terry Fabrics," by T. Hargreaves, The Textile Manufacturer, November 1954, pages 562–564.